United States Patent Office 2,836,296
Patented May 27, 1958

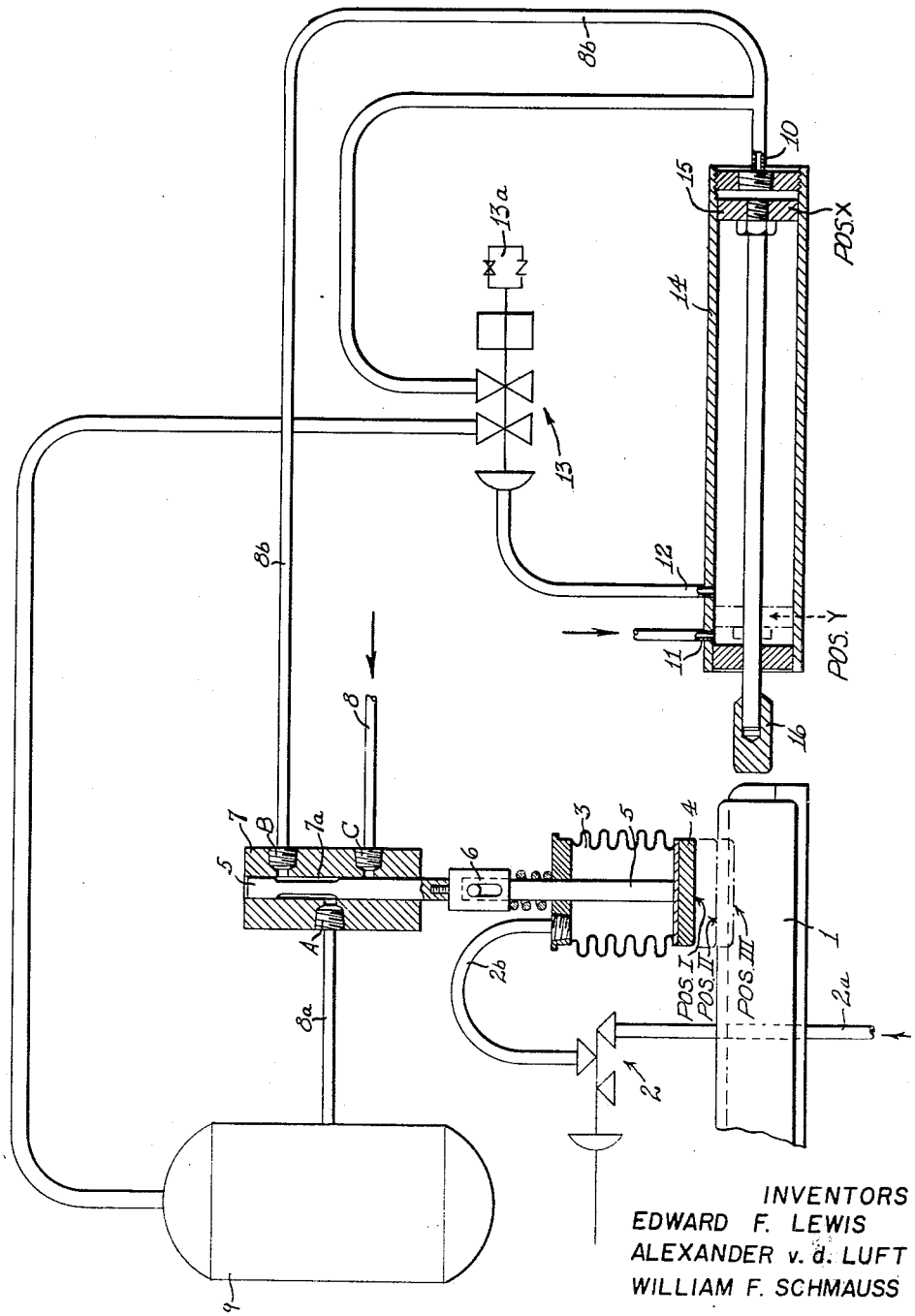

2,836,296

DETECTOR APPARATUS

Edward F. Lewis, Alexander v. d. Luft, and William F. Schmauss, Martinsburg, W. Va., assignors to E. I. du Pont de Nemours and Company, Wilmington, Del., a corporation of Delaware Application March 28, 1955, Serial No. 497,232

3 Claims. (Cl. 209—88)

The present invention relates to an automatic testing device susceptible of use in numerous manufacturing processes for detecting the presence of and rejecting any units of the manufactured product which are imperfect in certain respects and thus unsatisfactory.

The invention pertains to the many items of manufacture on the commercial market today which consist essentially of a non-rigid container filled with a granular or pliant substance. By "non-rigid" container we mean a tubular or elongated container, the continuous wall of which is to some extent flexible or depressible. For example, many foodstuffs such as salt, cereal, and candy are often packaged in elongated cardboard containers. High explosive blasting cartridges are waxpaper tubes filled with a granular or plastic explosive composition. In the mass-production manufacture of any item of this nature it is desirable to provide some means for quickly and efficiently testing each container to determine whether it has been completely filled. It is of course possible to perform this testing by hand by having an operator squeeze or pinch each package. But this would be extremely slow and costly. With such a cumbersome system, it would not be possible in most mass-production industries to test each package. Testing would necessarily be limited to "spot" or sample checks, thus permitting many imperfects to pass through the production line undetected.

It is an object of the present invention to provide an apparatus capable of testing large quantities of a mass-produced article of the type described above in order to detect the presence of defective articles and to reject same from the production system.

It is a further object of the present invention to provide an apparatus of this nature which is susceptible of a wide variety of industrial applications and which may be easily and economically installed in connection with industrial equipment presently in use. Other and additional objects will become apparent from a consideration of the following specification and claims.

The invention consists essentially of a contact or "feeler" head mounted on one end of a movable member and operatively connected to a suitable control arm which, under certain predetermined operating conditions, will by means of a pneumatic or hydraulic control system actuate a plunger to eject the faulty article or articles.

A more complete understanding of the invention will be gained from a consideration of the attached drawing, which is a schematic representation of one embodiment of the invention. The embodiment depicted is intended as illustrative only and should not be construed as limiting the invention to the particular components shown.

In the drawing, 1 represents a container which, for purposes of illustration, is shown as an explosive cartridge since the invention is deemed to be especially suitable for use in that specific field of manufacture. The shell of the cartridge is heavy-duty waxpaper, into which has been poured or packed a granular explosive composition. A movable member 3, illustrated as an expansible bellows, carries the contact or "feeler" head 4 at its lower end. Valve 2 controls the flow of compressed air from inlet 2a to the bellows through line 2b. Control arm 5 is secured to the inner face of contact head 4 and extends upwardly into valve 7 carrying lost-motion connection 6 near its midpoint. Valve 7 is a three-way pilot valve which may be ported A—B or A—C, depending upon the longitudinal position of the recess 7a in the upper end of control arm 5 within the valve. A high-pressure source of compressed air is constantly available to valve 7 at port C by means of line 8.

A chamber 9 is directly connected to port A of valve 7 by means of line 8a, and pneumatic cylinder 14 containing piston 15 with plunger 16 affixed thereto, is connected to valve 7 at port B by line 8b. Line 8b enters cylinder 14 at inlet 10. A compressed air supply is available to cylinder 14 at its end remote from inlet 10 via line 11. Line 12 connects cylinder 14 at a point between line 11 and inlet 10 to a two-way valve 13 with dashpot 13a to control the valve's closing time.

The operation of the device is as follows: When at rest, valve 2 is closed and bellows 3 is collapsed; valve 7 is ported A—B and port C is closed. Valve 13 is closed, as are lines from cylinder 14 and chamber 9. The pressure in chamber 9 is exhausted. Low pressure air supply from line 11 is just sufficient to maintain the piston of reject cylinder 14 in position "X" shown in the drawing.

The detection cycle is commenced by a signal which opens valve 2 thereby connecting bellows 3 and air supply 2a through the line 2b. Bellows 3 is expanded moving contact head 4 downward into contact with the surface of cartridge 1. Control arm 5 shifts in place with the downward movement of head 4. If cartridge 1 is completely filled with powder, contact head 4 can travel no farther downward than the wall of the cartridge (position II shown in the drawings). The corresponding shift of control arm 5 will be taken up by lost-motion connection 6, and the remaining components of the apparatus will be unaffected. Valve 2 is is then closed to cut off bellows 3 from air supply 2a, thus exhausting and retracting the bellows. Head 4 is then in position to test the next cartridge.

If cartridge 1 is defective, i. e., only partially filled with powder, head member 4 will depress the wall of cartridge 1 and will thus be able to travel downwardly as far as position III shown in the drawing. This doward movement will not only shift control arm 5 to the limit of lost-motion connection 6, but will shift the control arm even farther, lowering the recess 7a to port valve 7, A—C. This connects high-pressure air supply 8 with chamber 9, through the valve 7 and line 8a. When valve 2 is now closed, exhausting bellows 3 and shifting head 4 and control arm 5 to its starting position, the compressed air charge in chamber 9 just received from line 8 will vent through valve 7 (again ported A—B) and line 8b to inlet 10 of cylinder 14. This pressure in the head of reject cylinder 14 will drive piston 15 from position "X" to position "Y" shown in the drawings. A low pressure air cushion provided by line 11 at the base of reject cylinder 14 prevents piston 15 from travelling beyond position "Y." The travel of piston 15 from position "X" to position "Y" moves plunger 16 carried thereon to reject cartridge 1 from its holder.

Upon completion of the ejection stroke of plunger 16, piston 15 is in position "Y" between lines 11 and 12. This submits line 12 to the pressure existing at inlet 10. Valve 13 is shifted to the open position by this pressure and the residual pressure in chamber 9 and the head of reject cylinder is exhausted. Piston 15 is reset from position "Y" to position "X" by the low pressure air cushion provided by line 11. Valve 13 is then closed under the time delay action of a dashpot 13a. The reject cycle is complete and the device is in position to test the next cartridge.

The air supply in line 2a is regulated by adjusting its pressure to correspond to the degree of firmness desired in the cartridge 1.

Hydraulic components may of course be substituted for pneumatic elements illustrated in the attached drawings. Any suitable control system may be used in lieu of the specific pneumatic system depicted in the drawings. A pneumatic or hydraulically operated cylinder may be substituted for the expansible bellows 3. Other suitable variations in the specific components shown may be made without departing from the spirit of the present invention.

The construction of valves 2, 7, and 13 forms no part of the present invention. There are numerous commercial valve mechanisms available on the market which are capable of performing the various functions indicated and any of these common valves are quite suitable in the practice of the present invention.

For simplicity, the device as illustrated shows but a single "feeler" head 4 and a single reject plunger 16. It will be readily understood that the present invention contemplates in most instances using banks or series of heads and plungers in any desirable number. This arrangement will permit the simultaneous testing of large numbers of articles while only those which are imperfect, i. e., partially filled, will be rejected.

It will be apparent that the foregoing apparatus provides a simple and efficient means for testing such mass-produced articles as explosive cartridges and for rejecting those cartridges which are found to be only partially filled. Having thus described our invention, we intend to be limited only by the following claims.

We claim:

1. In a mass-production manufacturing process, a device for detecting and ejecting a partially filled container comprising a head member operatively supported on one end of an expandable member having an internal cavity, a control arm fixed to said head member and extending longitudinally through said expandable member, a source of a fluid control medium selectively connected to the interior of said expandable member to actuate same and thereby move said head member into contact with a wall of said container to shift said control arm, a fluid control system actuable only upon shifting of said control arm a distance at least as great as the displacement of said head member when said head member depresses the wall of said container beyond a predetermined extent, and a plunger actuated by said control system to eject the container which has been depressed as aforesaid by said head member.

2. In a process for manufacturing explosive cartridges, a device for detecting and ejecting partially filled cartridges comprising a head member operatively supported on one end of an expandable member having an internal cavity, a control arm fixed at one extremity to said head member and extending longitudinally through said expandable member, a valve member operatively connected to the interior of the other extremity of said control arm, a source of a fluid control medium selectively connected to said expandable member to actuate same and thereby move said head member into contact with the wall of said cartridge thereby shifting said control arm, a fluid control system actuable by said valve member only upon shifting of the control arm a distance at least as great as the displacement of said head member when the head member depresses the wall of said cartridge beyond a predetermined extent, and a plunger actuated by said control system to eject the cartridge which has been depressed as aforesaid by said head member, said fluid control system including means for returning the plunger to its starting position after it has ejected the partially filled cartridge.

3. In a process for the mass-production manufacture of explosive cartridges, a device for detecting and ejecting partially filled cartridges which comprises a contact head movably supported on one end of a hollow expansible bellows, a control arm fixed at one extremity to said contact head and extending longitudinally through said bellows, a valve member operatively connected to the other extremity of said control arm, a source of compressed air selectively connected to the interior of said bellows to expand same and move said contact head into contact with the wall of said cartridge thereby shifting said control arm, a pneumatic control system actuable by said valve member only upon shifting of the control arm a distance at least as great as the displacement of said contact head when the contact head depresses the wall of said cartridge beyond a predetermined extent, a pneumatic cylinder operatively connected at its head to said pneumatic control system, a piston within said cylinder having a protruding plunger secured thereto, a compressed air inlet to said cylinder at the end remote from its head, a vent in said cylinder between the head and said compressed air inlet whereby air pressure delivered to the cylinder at its head will displace the piston and attendant plunger to eject the cartridge which has been depressed by the contact head, and compressed air from the inlet will return the piston and plunger to their starting position.

References Cited in the file of this patent

UNITED STATES PATENTS

| 2,008,870 | Little | July 23, 1935 |
| 2,040,436 | Howard | May 12, 1936 |
| 2,225,005 | Gudger | Dec. 17, 1940 |
| 2,591,868 | Puster | Apr. 8, 1952 |
| 2,696,107 | Blaing-Leisk | Dec. 7, 1954 |